Oct. 18, 1949.  C. WOOD  2,485,179
ARTIFICIAL BAIT
Filed Jan. 21, 1946

Conrad Wood
INVENTOR.

BY  *C. A. Knowles*
ATTORNEYS.

Patented Oct. 18, 1949

2,485,179

UNITED STATES PATENT OFFICE 2,485,179

ARTIFICIAL BAIT

Conrad Wood, El Dorado, Ark., assignor to Wood Manufacturing Company, El Dorado, Ark.; J. B. Wood sole owner Application January 21, 1946, Serial No. 642,535

2 Claims. (Cl. 43—42.06)

1

This invention relates to artificial bait or fish lures used in line fishing.

The primary object of the invention is to provide an artificial bait or lure wherein rolling or rocking movement of the lure will be prevented and a more natural movement simulating live bait, which is more in the form of a wiggle in a true horizontal plane, will be imparted to the lure, as it is drawn through the water.

Another object of the invention is to provide a metal lure constructed in such a way that a buoyant body of the desired color may be readily secured between the side members of the lure, adapting the lure for use under varying conditions.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing.

Figure 1:
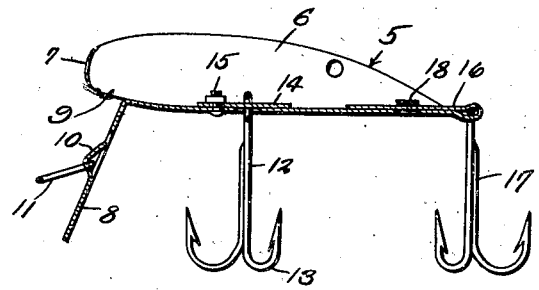
Figure 1 is a longitudinal sectional view through a lure constructed in accordance with the invention.
Figure 2:
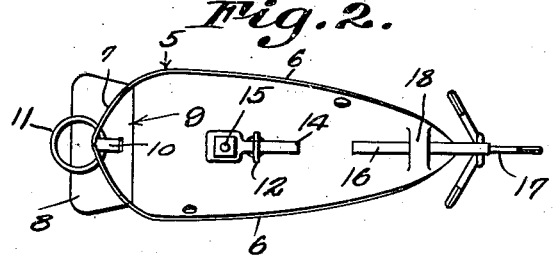
Figure 2 is a plan view thereof.
Figure 3:
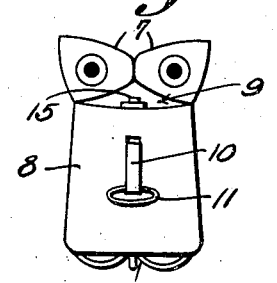
Figure 3 is a front elevational view of the lure.

Referring to the drawing in detail, the artificial bait or lure comprises a body portion indicated generally by the reference character 5, the body portion being constructed of sheet metal material formed in such a way as to provide upstanding side members 6, the forward ends 7 thereof being curved inwardly providing what might be termed the head of the lure. These inturned forward ends of the side members 6 are painted to represent eyes of a minnow.

Extending downwardly from the forward end of the body portion, is a lip 8, which is disposed at an obtuse angle with respect to the lower edge of the body, there being provided an opening 9 between the lower edges of the inturned forward ends of the side members 6 and upper edge of the lip 8, so that water may pass into the body portion, through the opening to cause the lure to wiggle as it is being drawn through the water. Due to the fact that the lip extends an

2 appreciable distance below the lower surface of the body portion, this wiggling or lateral motion of the body portion will take place in a true horizontal plane.

Stamped from the central portion of the lip 8, is a tongue 10 to which the ring 11 is secured, the ring 11 affording means whereby a fishing line may be attached to the lure.

Formed in the bottom of the body portion 5 is an opening through which the shank 12 of the fish hooks 13 extends, the shank 12 being formed with an eye to receive the removable securing finger 14 which is secured within the body portion by means of the bolt 15. This finger 14 extends across the opening in the bottom of the body portion 5, and holds the hook 13 in place.

The reference character 16 indicates a finger which is formed integral with the rear end of the body portion, the finger being flexible so that it may be bent upon itself after it has been threaded through an eye of a fish hook, such as indicated at 17. The finger 16 is then passed under the strap 18 formed by punching a section of the body portion inwardly.

Figure 4:
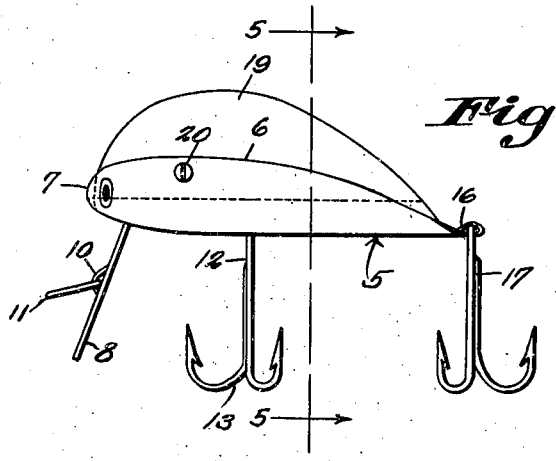
Figure 4 is a side elevational view thereof illustrating a removable buoyant body as secured thereto.
Figure 5:
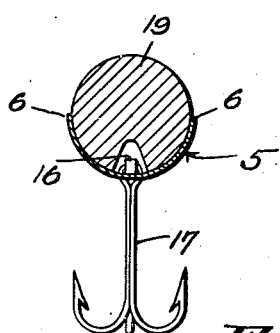
Figure 5 is a sectional view taken on line 5—5 of Figure 4.

Since the body portion 5 presents a substantially hollow structure, the buoyant body 19 which is shaped to fit the body portion, may be readily secured therein by means of screws 20, which extend through openings formed in the sides of the body portion, as clearly shown by Figure 4 of the drawing. In order that the hooks will have free pivotal movement with respect to the body 5, the buoyant body 19 is formed with a groove formed longitudinally of the lower edge thereof, the groove providing a clearance for the upper end of the shank of the hook 12.

From the foregoing, it will be seen that due to the construction shown and described, I have provided a lure which, when drawn through the water, will wiggle or move laterally in a true horizontal plane simulating the movements of a live minnow.

What is claimed is:

1. A fishing lure, comprising a body portion constructed of sheet metal material, comprising upwardly curved side members and a bottom, a buoyant body member adapted to be secured between the side members, said buoyant body having a longitudinal groove formed in the bottom thereof, providing a passage-way with the bottom of the body portion of the lure, and a tongue at the forward end of the body portion adapted to direct water upwardly through said passage-way.

2. A fishing lure comprising a body portion comprising inwardly curved side members and a bottom member, a buoyant body member secured between the side members, the bottom of the buoyant body member having a portion of the surface thereof spaced from the bottom of the body portion of the lure, providing a water passageway longitudinally of the lure, and means for directing water through the passageway, whereby when the lure is moved through a body of water it is caused to wobble.

CONRAD WOOD.

REFERENCES CITED

The following references are of record in the file of this patent:

UNITED STATES PATENTS

| Number | Name | Date |
|---|---|---|
| 1,585,943 | Streich | May 25, 1926 |
| 1,589,258 | Stanley | June 15, 1926 |
| 1,600,652 | Steenstrup | Sept. 21, 1926 |
| 2,013,898 | Ridenour | Sept. 10, 1935 |
| 2,088,775 | Davenport | Aug. 3, 1937 |
| 2,214,668 | Erickson | Sept. 10, 1940 |